Nov. 30, 1954 T. S. DONNELLY, JR 2,695,944

ELECTRODE HOLDER

Filed Dec. 14, 1951 3 Sheets-Sheet 1

INVENTOR.
THOMAS S. DONNELLY, JR.
BY
Thos. S. Donnelly
ATTORNEY.

INVENTOR.
THOMAS S. DONNELLY JR.
BY
Thos S. Donnelly
ATTORNEY.

Nov. 30, 1954

T. S. DONNELLY, JR 2,695,944

ELECTRODE HOLDER

Filed Dec. 14, 1951

3 Sheets-Sheet 3

INVENTOR.
THOMAS S. DONNELLY, JR.
BY
Thos. S. Donnelly
ATTORNEY.

2,695,944

ELECTRODE HOLDER

Thomas S. Donnelly, Jr., Detroit, Mich.

Application December 14, 1951, Serial No. 261,727

13 Claims. (Cl. 219—8)

My invention relates to a new and useful improvement in an electrode holder used for electric arc welding.

In the use of electrode holders in electric arc welding operations the electrode is clamped between a pair of jaws and these jaws wear out and burn out before the remainder of the electrode holder has suffered much wear. It is a common practice to provide the jaws, at the electrode engaging portion, with a removable electrode engaging plate. These plates are generally screwed onto the jaw proper which serves as a retainer for the plates. The screws also become damaged in the welding operation so that it frequently is difficult, and sometimes impossible, to remove the screws so that the plates may be replaced. It is an object of the present invention to provide an electrode holder so arranged and constructed that the electrode engaging plate or plates may be easily and quickly removed and replaced.

Another objectionable feature with the removable plates is that frequently there is a poor contact between the plates and the retainer on which the plate is mounted and which serves as the conductor of electricity. It is an object of the present invention to provide a construction whereby a close contact may be maintained at all times between the removable plate and the electricity conducting portion, thus assuring a good contact with the inherent advantages.

Another object of the invention is the provision of a construction whereby a removable plate may be used and the conducting cable secured in engagement with the plate so as to underlie the surface of the plate engaged by the electrode and to utilize the means which serves to secure the cable in position for effecting a binding of the removable plate on the retaining portion.

Other objects will appear hereinafter.

It is recognized that various modifications and changes may be made in the details of structure illustrated without departing from the invention and it is intended that the present disclosure shall be considered but the preferred embodiment.

Figure 1:
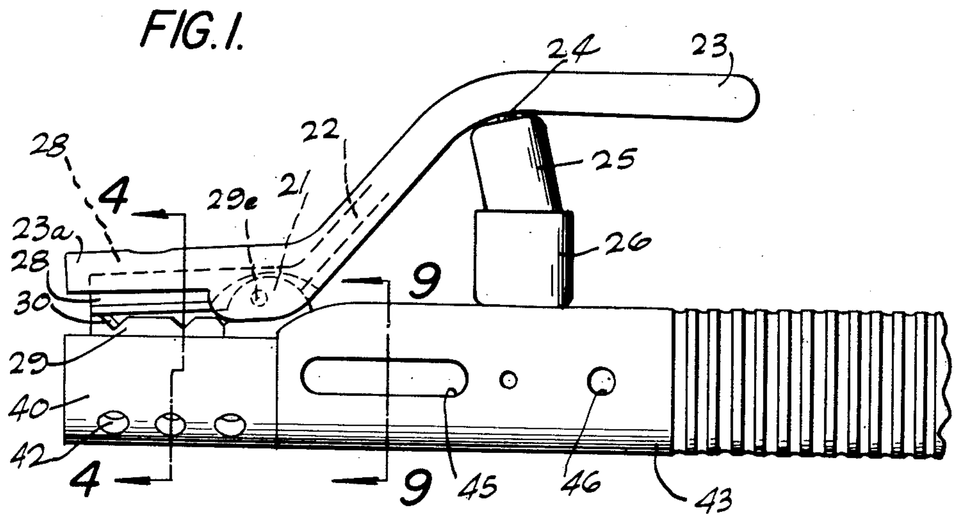
Figures 2, 3, 4:
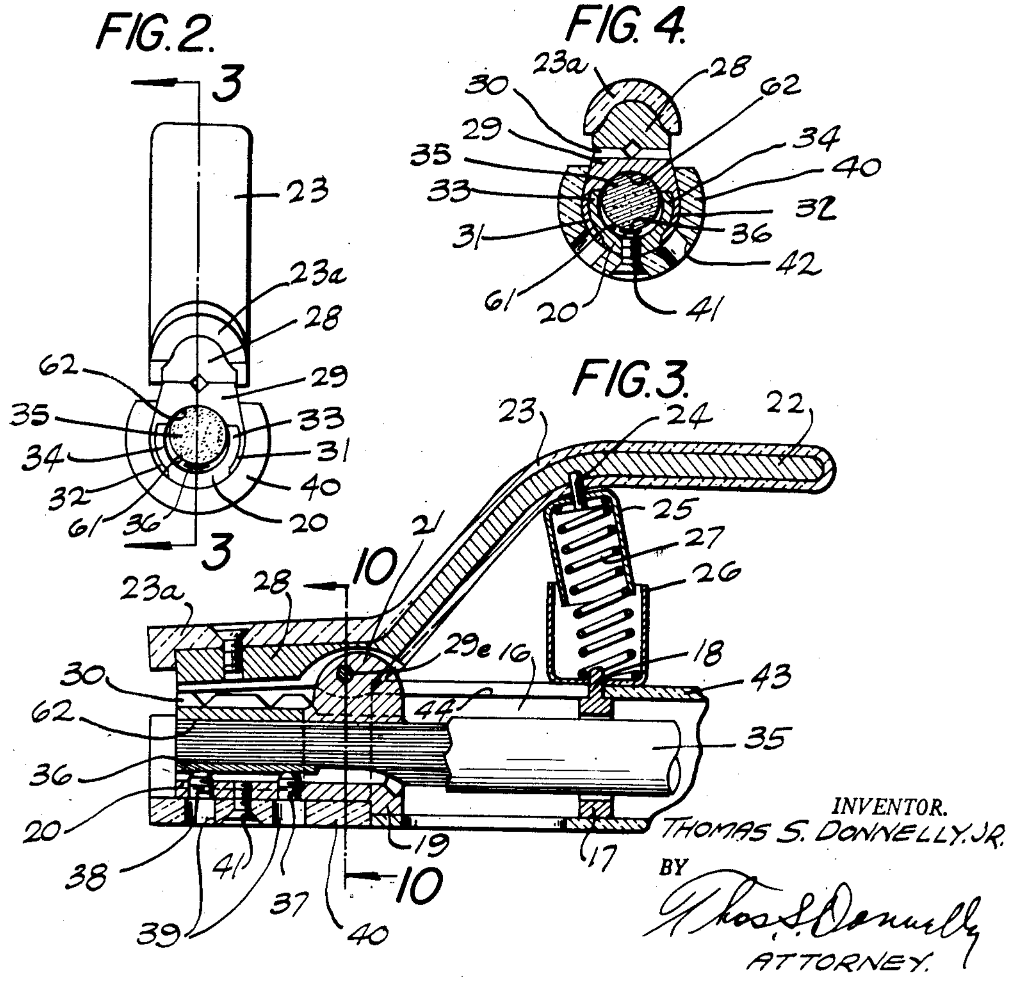
Figures 5, 6, 7, 17:
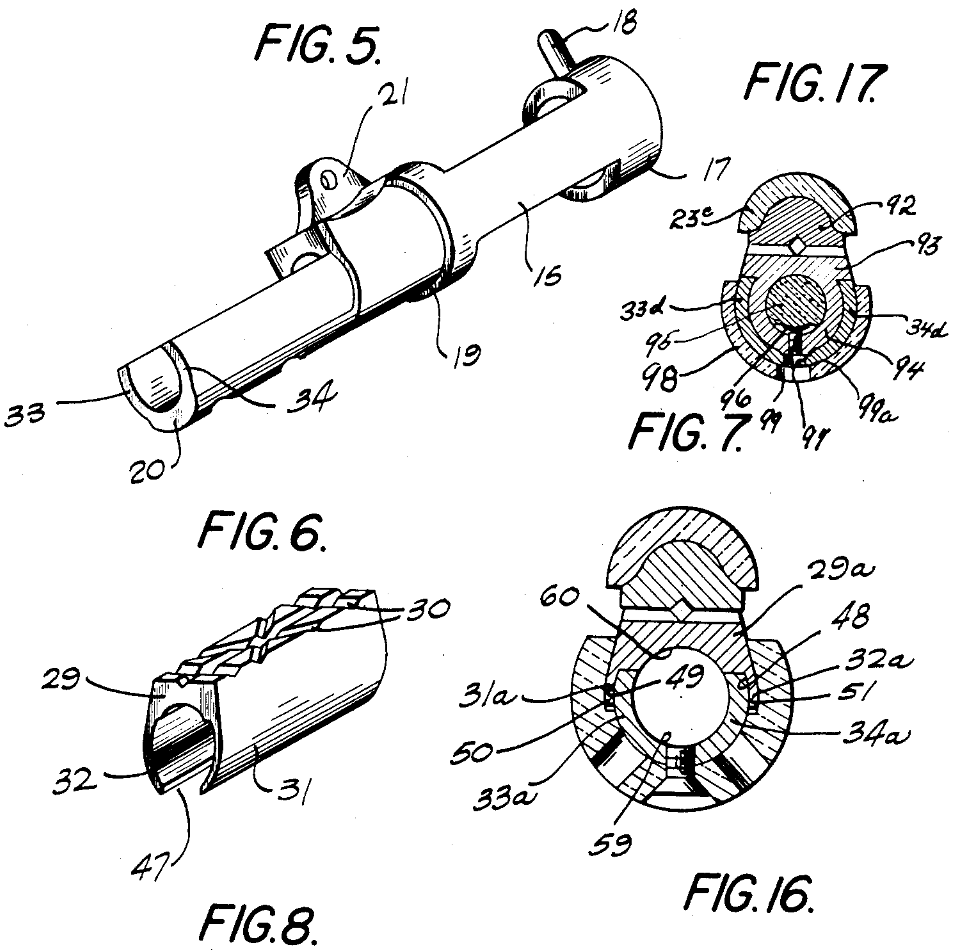
Figure 8:
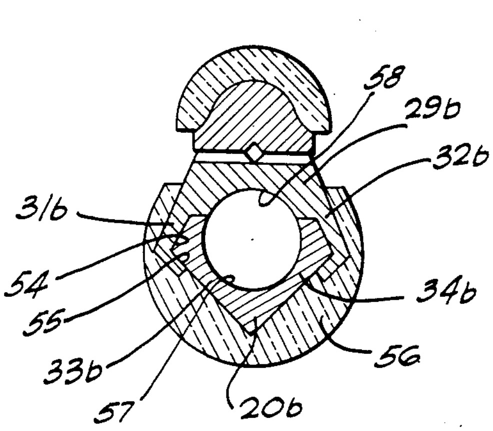
Figure 16:
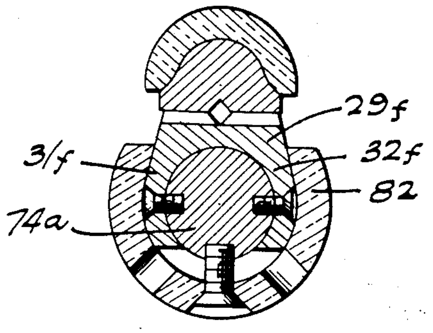
Figures 9, 10, 11, 12, 13:
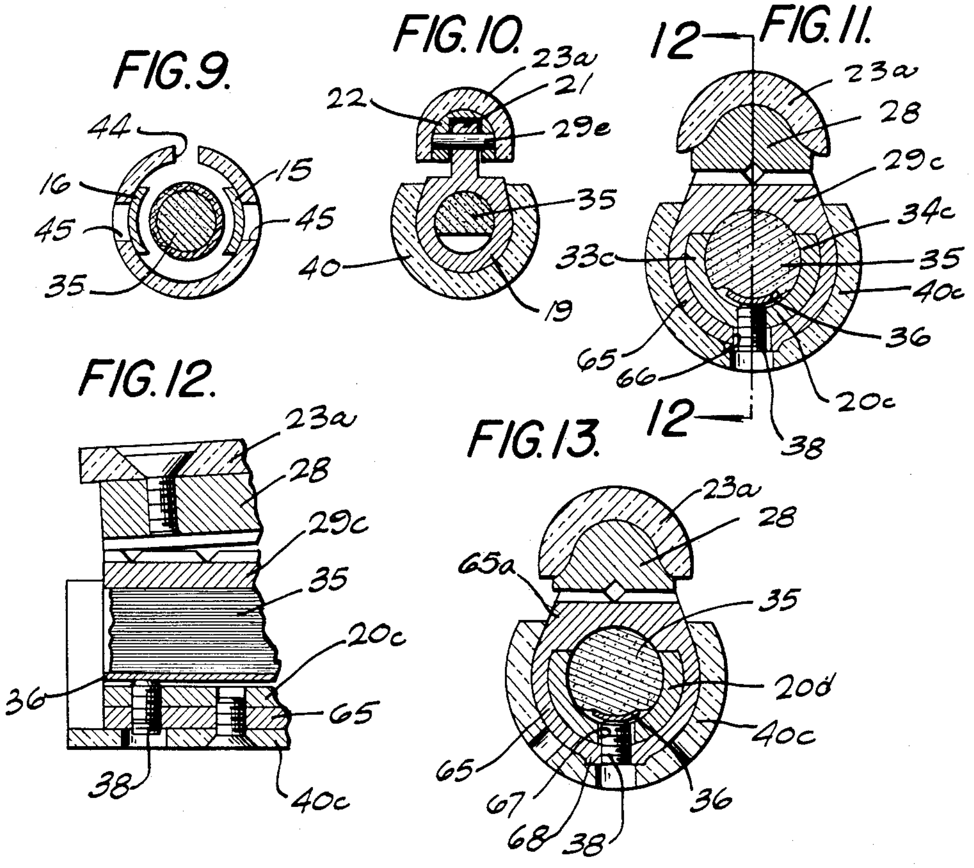
Figure 14:
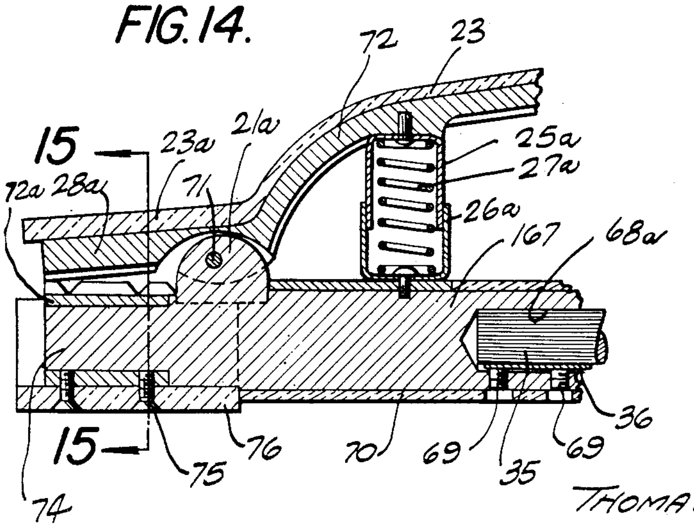
Figure 15:
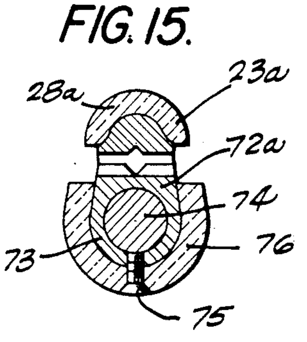

Forming a part of this application are drawings in which:

Fig. 1 is a side elevational view of an electrode holder with the invention applied, Fig. 2 is a front elevational view of the electrode holder shown in Fig. 1, Fig. 3 is a fragmentary sectional view taken on line 3—3 of Fig. 2, Fig. 4 is a sectional view taken on line 4—4 of Fig. 1, Fig. 5 is a perspective view of the handle retainer used in the invention, Fig. 6 is a perspective view of a removable jaw or clamping plate used in the invention, Fig. 7 is a sectional view similar to Fig. 4 showing a modification, Fig. 8 is a sectional view similar to Fig. 4 showing a further modification, Fig. 9 is a sectional view taken on line 9—9 of Fig. 1, Fig. 10 is a sectional view taken on line 10—10 of Fig. 3, Fig. 11 is a sectional view similar to Fig. 4 showing a further modified form, Fig. 12 is a fragmentary sectional view taken on line 12—12 of Fig. 11, Fig. 13 is a view similar to Fig. 11 showing a slight modification thereof, Fig. 14 is a fragmentary sectional view similar to Fig. 3 showing a modification, Fig. 15 is a sectional view taken on line 15—15 of Fig. 14, Fig. 16 is a view similar to Fig. 15 illustrating the part shown in Fig. 6 as mounted on a solid body, Fig. 17 is a sectional view similar to Fig. 13 but showing some of the parts in reverse position.

In the drawings I have illustrated the invention as embodying a rigid handle supporting member comprising the oppositely disposed side plates 15 and 16 connected at their rear ends by the annulus 17, projecting upwardly from which is a stud 18. These plates 15 and 16 are connected at their forward ends to a tubular portion 19, projecting outwardly from which is a trough-shaped member which may be designated generally by the numeral 20. Projecting upwardly from this tubular portion 19 is a lug 21 on which is pivotally mounted, by means of the pin 29*e*, a handle 22 having the jaw forming portion 28, which may also serve as a retainer for a removable plate. The handle 22 is covered by a layer 23 of suitable insulating material having the forwardly directed portion 23*a*, which also serves to cover the jaw or jaw retainer. Projecting through this layer 23 of insulating material, from the handle 22, is a stud 24, which projects through the end of an insulating cup 25 which telescopes with the cup 26, into which is projected the stud 18. These cups serve to enclose the spring 27 which serves to normally retain the clamping jaws in clamping relation.

The removable plate 29 is provided on its face with a plurality of grooves 30 in which the electrode may engage, so that the angle of the extension of the electrode from the clamping jaws may be determined. This member 29 may be termed a removable jaw or a removable plate. As shown in Fig. 6, it is provided with the oppositely disposed walls 31 and 32. The member 20 is also provided with the oppositely disposed walls 33 and 34, as clearly seen in Fig. 2 and in Fig. 5. The inner surfaces of the walls 31 and 32 conform to the curvature of the outer surfaces of the walls 33 and 34. The construction is such that the plate 29 may be slipped longitudinally from the forward end onto the member 20 into the position shown in Fig. 2 and Fig. 4.

The cable 35, which is connected to the welding machine and serves to conduct the welding current, is projected through the annulus 17 and the bared end thereof is projected through the tubular portion 19 and into the trough-shaped member 20. A presser clip 36 is positioned beneath the bared end of this cable and is engaged by screws 37 and 38 threaded through the bottom of the member 20. When these screws are threaded inwardly they will force the presser clip 36 to move the cable into engagement with the surface 62 of the member 29. This surface 62 together with the space 61 of the member 20 provides a passage for reception of the bared end of the cable. As this pressure, exerted by the screws 37 and 38, is effected, the cable will be forced radially upwardly so as to effect a pressure on the member 29 radially away from the member 20. In view of the fact that the walls 31 and 32 have a space 47 between their opposed edges less than the width of the walls 33 and 34, this pressure on the member 29 will move the walls 31 and 32 into closer engagement with the walls 33 and 34, so that a tight contact is thus provided and arcing between the members 31 and 33 and the members 32 and 34 is avoided. This pressure also serves to bind the member 29 fixedly on the trough-shaped member 20, which serves as a retainer for this removable jaw. It will be noted that there are no screws threaded into the member 29 and that it is fixed on the retaining portion 20 solely by the pressure referred to.

When it becomes desirable to remove the member 29 and replace it with a new electrode engaging portion, it is but necessary to relieve the pressure by backing out the screws 37 and 38. The member 29 may then be moved longitudinally forwardly of the retainer 20 and replaced with a new plate.

In some instances it is desirable to have the clamping jaws insulated and for this purpose I have provided the trough-shaped insulating member 40 having the openings 39 formed therethrough to render the screws 37 and 38 easily accessible. If desired the member 40 may be prevented from longitudinal movement on the member 20 by means of the screw 41 threaded into the member 20. However, this longitudinal movement may also be avoided by forming one or both of the screws 37 or 38 of sufficient length to project into the openings 39 when these screws are in cable pressing position. It will be noted also that the insulation 40 is trough-shaped and that it embraces the walls 31 and 32 and that the space between the opposed longitudinal edges of the member 40 is less than the transverse width of the walls 31 and 32 covered by the member 40, so that radial movement of the member 40 onto or off of the forward end of the structure is impossible and the only way that the member 40 may be mounted in position is by longitudinal slidable movement rearwardly from the forward end of the holder. As shown in Fig. 4, this insulating member 40 is provided with openings 42 which serve as ventilating openings to permit the forward end of the holder to radiate heat.

A handle 43 is mounted on the holder retaining portion embodying the plates 15 and 16 and the annulus 17 and the tubular member 19. This handle 43 is provided with a slot 44 for accommodating the stud 18 as the handle is slid onto the handle retaining portion from the rear end. The handle is also provided with ventilating slots 45 and ventilating openings 46.

In Fig. 7 I have shown a slight modification. The member 29*a* corresponds to the member 29 of the form already described and is provided with the opposite side walls 31*a* and 32*a* adapted for slidable movement onto the walls 33*a* and 34*a*. These walls 31*a* and 32*a* are cutaway as at 48 and the walls 33*a* and 34*a* are cutaway as at 49 to provide the inter-engaging shoulders 50 and 51. These two cooperating parts provide the cable receiving spaces 59 and 60 and the cable is secured in the manner already described.

In Fig. 8 I have shown a further modification in which the member 29*b* corresponds to the member 29 of the first form described. Extending outwardly from the member 29*b* are the walls 31*b* and 32*b*. The member 20*b* is provided with the walls 34*b* and 33*b*. The walls 31*b* and 32*b* are provided with the inner surfaces 54 and 55, which bear against the outer surfaces of the walls 33*b* and 34*b*. These members 29*b* and 20*b*, by the spaces 57 and 58, provide a passage for the reception of the bared end of the cable and the insulation 56 is slid longitudinally onto the structure. The cable is secured in the manner already described and the pressure exerted against the cable will cause the parts to move into close contact, inasmuch as they cannot be separated by a radial movement. This also, of course, applies to the form shown in Fig. 7.

In Fig. 11 I have shown a modified form in which the parts 28 and 23*a* are as described as the form shown in Fig. 1. The part 29*c* corresponds to the jaw 29. The modification in Fig. 11 consists primarily in forming the part shown in Fig. 6 without the separation or space 47, so that instead of the separate walls 31 and 32 shown in Fig. 6 a loop or annulus 65 is formed on the jaw 29*c*. Formed in the under surface of the jaw 29*c* is a recess 66 which, together with the space in the trough 20*c*, corresponding to the part indicated generally by the numeral 20 in Fig. 5, provides a space for the bared end of the cable 35 which is clamped by the presser clip 36 engaged by the screw 38 which passes through an opening 66 formed in the loop 65 and which is threaded into the trough-shaped member 20*c*. The walls 33*c* and 34*c* correspond respectively to the walls 33 and 34 in the form illustrated in Fig. 1. The insulation 40*c* corresponds to the insulation 40.

In the form shown in Fig. 13 the structure is the same as that shown in Fig. 11, except that the screw 38 instead of threading into the trough 20*d* projects through an enlarged opening 67 formed therein and threads into the rib 68 formed on the loop or ring 65. In this form when the screw 38 is threaded inwardly the bared end 35 of the cable will be pressed against the under surface of the electrode engaging jaw 65*a*. This secures the ring 65 and jaw 65*a* in fixed relation to the cable. The bared end 35 of the cable is, in this squeezing or pressing operation, flattened out so that it is forced into tight frictional contact with the side faces of the trough 20*d* so that the trough-shaped member also is thus fixed relatively to the bared end 35 of the cable. Moreover the projection of the screw 38 through the opening 67 retains the members 65 and 20*d* in fixed longitudinal relation, as there is but a slight clearance between the screw 38 and the opening 67.

In Fig. 14 and Fig. 15 I have shown a slight modification illustrating particularly the use of a replaceable jaw. In this structure the electrode holder consists of a metallic shank 167 having a well or socket 68*a* formed therein into which is inserted the bared end of the cable 35 against which is forced the presser clip 36 acted upon by the screws 69. This metallic shank 167 is embraced by the forward end of a handle 70 formed from fiber or other suitable insulating material. Cups 25*a* and 26*a* enclose a spring 27*a*. One of these bears against the handle 70 and the other bears against the handle 72. This handle 72 is pivoted at 71 and carries at its forward end an upper jaw 28*a*, so that the spring serves to normally retain the parts rocked to the position shown in Fig. 14. A layer 23 of insulating material covers the handle 72 and an extension 23*a* of this layer of insulating material covers the upper jaw 28*a*. The handle is pivoted as at 71 on the lug 21*a*. A lower jaw 72*a* is provided with a loop or ring 73 corresponding in structure to the jaw and loop or ring shown in Fig. 11 and Fig. 13. This jaw, together with the loop or ring, may be considered a tubular body with a jaw on one side of the tubular portion. This tubular member is fitted over the reduced end 74 of the shank 167 and is held in position thereon by means of the screws 75, which also serve to retain the layer 76 of insulating material in position.

With electrode holders having a solid retaining body, such as shown, attempts have been made to secure the electrode engaging jaw thereon so that it may be removed when worn out. This has generally been attempted to be accomplished by forming the electrode engaging portion or jaw in the form of a plate and screwing the plate onto the metallic retainer which corresponds to the jaw 74 shown in Fig. 14. This has proven unsatisfactory in view of the fact that the screws used to retain the plate in position become welded or "frozen" to the metallic supporting part. With the present invention the tubular jaw embodying the parts 72*a* and 73 may be slid longitudinally onto the member 74 and the retaining screws are not in such a position that they are likely to be welded or come into contact with the weld splatter.

In Fig. 16 I have shown the jaw, constructed as illustrated in Fig. 6, snapped onto a solid body with the retaining screws projecting inwardly from opposite sides and covered by the layer of insulation 82. The jaw 29*f* with the side walls 31*f* and 32*f* are slid longitudinally onto the body 74*a*. This construction may be a snug or press fit but it is preferred that it be a snug fit and that screws be used to secure the jaw on the retaining body.

In Fig. 17 I have shown the upper jaw 92 provided with the layer 23*c* of insulation. A lower jaw 93 is carried by the tubular member 94 into which is slipped the bared end 95 of the cable which is clamped therein by means of the presser clip 96 and the screw 97. The trough-shaped member embodying the side walls 33*d* and 34*d* corresponds to the trough-shaped member shown in Fig. 4, excepting that this trough is positioned on the outside of the tube 94. This construction may be said to be the same as that shown in Fig. 11 or Fig. 13 except that the parts are reversed. A layer 98 of insulating material embraces the trough-shaped member and an opening 99 is formed in the insulating material for registering with an opening 99*a* formed in the trough, so that access to the screw 97 may be had through these openings.

What I claim is:

1. In an electrode holder of the class described having a jaw retainer, a jaw; a pair of side walls, one side wall being at each of the opposite sides of said jaw and projecting outwardly from one face thereof and said walls terminating at their free edges in spaced relation to each other, said jaw being slidable longitudinally onto said retainer and said side walls being spaced-apart inwardly of their free edges a greater distance than at their free edges and the width of said retainer inwardly of the free edges of said walls being greater than the space between the opposed edges of said walls.

2. In an electrode holder a handle supporting portion; a trough-shaped retainer projecting forwardly of said handle supporting portion; an electrode engaging jaw;

an embracing portion on said jaw for embracing said retainer, there being a space between the bottom of said trough-shaped retainer and the opposed face of said jaw for reception of a conducting cable; a pressure exerting element carried by said retainer for exerting pressure against said cable and forcing the same against said opposed face of said jaw for establishing close contact of the same with said cable.

3. In an electrode holder of the class described, a passage bearing retainer to provide a passage for the reception of the bared end of an electric cable; an electrode engaging jaw for engaging at its upper face an electrode; oppositely disposed spaced-apart side walls on said jaw for projecting outwardly from the lower face thereof for sliding onto said retainer in telescopic relation, said jaw and said retainer being non-detachable radially after movement of the same into telescopic relation; and a pressure exerting element for pressing the bared end of said cable into close contact with the lower face of said jaw.

4. In an electrode holder of the class described, a handle supporting member; a jaw retaining portion projecting forwardly from said supporting member; an electrode engaging jaw for engaging at one of its faces an electrode; an embracing portion on said jaw for embracing said retaining portion upon slidable movement thereon longitudinally thereof; and a presser element for exerting pressure between said retainer and said embracing portion for securing said retainer and said jaw in fixed relation to each other.

5. In an electrode holder of the class described a retaining portion; a jaw for engaging at one of its faces an electrode; and an encircling band on said jaw for embracing said retainer, said encircling band and said retainer being adapted for movement longitudinally into telescopic relation.

6. In an electrode holder of the class described, a trough-shaped retainer open at one side and adapted for the reception of the bared end of an electric cable; an electrode engaging jaw for engaging at one of its faces an electrode; side walls projecting outwardly from opposite edges of the opposite face of said jaw, said jaw being adapted for movement into telescopic relation with said retainer and forming a closure for said open side; and inter-engaging portions on said side walls and said retainer for preventing radial relative movement of said jaw and said retainer after movement of said side walls into telescopic relation with said retainer while permitting free longitudinal movement of said jaw and said retainer and means for pressing said bared end of said cable radially of said trough-shaped retainer into engagement with one face of said jaw.

7. In an electrode holder of the class described, a jaw retaining member; an electrode engaging jaw for engaging at one of its faces an electrode; a tubular portion extending outwardly from the opposite face of said jaw and slidable onto said retainer in embracing relation thereto.

8. In an electrode holder of the class described, a jaw retaining member; an electrode engaging jaw for engaging at one of its faces an electrode; a tubular portion extending outwardly from the opposite face of said jaw and slidable onto said retainer in embracing relation thereto; and threaded means for securing said retaining portion and said tubular member in fixed relation.

9. In an electrode holder of the class described a jaw retaining member; an electrode engaging jaw for engaging, at one of its faces, an electrode; an embracing portion carried by said jaw and projecting outwardly from the opposite face thereof and slidable longitudinally onto said retaining member, there being a space between the opposed faces of said jaw and said member for reception of an electric cable; and a threaded member threaded into said retaining member for exerting pressure against said cable and forcing the same against said opposed face of said jaw and delivering a thrust thereto for normally tending to move said jaw into separated relation with said retaining member and clamping said embracing portion against said retaining member.

10. In an electrode holder of the class described, a jaw retaining member; an electrode engaging jaw for engaging, at one of its faces, with an electrode; an embracing portion carried by said jaw and extending outwardly from its opposite face and slidable longitudinally onto said retaining member in embracing relation thereto, said embracing portion and said retaining member being non-detachable except upon longitudinal relative movement, there being a space between the opposed face of said retaining member and said opposite face of said jaw for reception of an electric cable; and threaded means for exerting pressure on said electric cable for forcing the same into close engagement with said opposite face of said jaw.

11. In an electrode holder of the class described, a trough-shaped retaining portion open at one side, the opposite edges of said open side being spaced apart and the width of said retainer inwardly from said opposite edges being greater than the space between the opposite edges; a jaw for engaging, at one of its faces, an electrode; a tubular portion projecting from another face of said jaw and slidable longitudinally into said trough-shaped portion from one end thereof for securing said jaw on said trough-shaped portion in fixed radial relation thereto.

12. In an electrode holder of the class described, a trough-shaped retaining portion open at one side, the opposite edges of said open side being spaced apart and the width of said retainer inwardly from said opposite edges being greater than the space between the opposite edges; a jaw for engaging, at one of its faces, an electrode; a tubular portion projecting from another face of said jaw and slidable longitudinally into said trough-shaped portion from one end thereof for securing said jaw on said trough-shaped portion in fixed radial relation thereto, the space between the opposite edges of said trough-shaped portion being less than the diameter of said tubular portion.

13. In an electrode holder of the class described, a trough-shaped retaining portion open at one side, the opposite edges of said open side being spaced apart and the width of said retainer inwardly from said opposite edges being greater than the space between the opposite edges; a jaw for engaging, at one of its faces, an electrode; a tubular portion projecting from another face of said jaw and slidable longitudinally into said trough-shaped portion from one end thereof for securing said jaw on said trough-shaped portion in fixed radial relation thereto, the space between the opposite edges of said trough-shaped portion being less than the diameter of said tubular portion, said trough-shaped portion and said tubular portion having registering openings formed therein, and said tubular portion being adapted for the reception of the bared end of a cable; and threaded means in said openings and pressing said end of said cable against the inner surface of said tubular portion.

References Cited in the file of this patent

UNITED STATES PATENTS

| Number | Name | Date |
|---|---|---|
| 2,003,196 | Jackson | May 28, 1935 |
| 2,056,045 | Fausek et al. | Sept. 29, 1936 |
| 2,179,440 | Wagner | Nov. 7, 1939 |
| 2,358,220 | Donelly, Jr. | Sept. 12, 1944 |
| 2,373,605 | Shellabarger | Apr. 10, 1945 |
| 2,387,888 | Donelly, Jr. | Oct. 30, 1945 |
| 2,412,492 | Brazitis | Dec. 10, 1946 |
| 2,415,671 | Camilleri | Feb. 11, 1947 |
| 2,449,370 | Donnelly | Sept. 14, 1948 |
| 2,455,108 | Beauregard | Nov. 30, 1948 |

FOREIGN PATENTS

| Number | Country | Date |
|---|---|---|
| 571,035 | Great Britain | Aug. 2, 1945 |